(12) United States Patent
Lutz

(10) Patent No.: US 6,467,760 B2
(45) Date of Patent: Oct. 22, 2002

(54) FILLING VALVE FOR A GAS BAG

(75) Inventor: Dieter Lutz, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/866,124

(22) Filed: May 25, 2001

(65) Prior Publication Data

US 2001/0054530 A1 Dec. 27, 2001

(30) Foreign Application Priority Data

May 31, 2000 (DE) .......................... 100 27 244

(51) Int. Cl.⁷ .................................. F16F 9/43
(52) U.S. Cl. ............... 267/64.28; 188/298; 267/122; 267/64.23; 267/64.27
(58) Field of Search ................ 188/297, 298, 188/301; 267/136, 122, 123, 64.28, 64.23, 64.27, 64.19

(56) References Cited

U.S. PATENT DOCUMENTS

| 2,256,835 A | | 9/1941 | Mercler | 267/64 |
|---|---|---|---|---|
| 3,625,321 A | * | 12/1971 | Lutz | 188/298 |
| 4,449,552 A | * | 5/1984 | Porel | 138/30 |
| 4,742,898 A | * | 5/1988 | Lee | 188/287 |
| 4,880,213 A | * | 11/1989 | Shinbori et al. | 188/298 |
| 5,543,194 A | * | 8/1996 | Rudy | 36/29 |
| 6,016,841 A | * | 1/2000 | Larsen | 138/30 |
| 6,116,585 A | * | 9/2000 | Lutz | 138/30 |

FOREIGN PATENT DOCUMENTS

| CH | 687409 | | 11/1996 | |
|---|---|---|---|---|
| DE | 1 782 480 | | 2/1959 | |
| DE | 1 625 474 | | 6/1970 | |
| DE | 29723380 | * | 8/1998 | .............. 267/64.27 |
| GB | 615860 | | 6/1949 | |

* cited by examiner

Primary Examiner—Christopher P. Schwartz
Assistant Examiner—Devon Kramer
(74) Attorney, Agent, or Firm—Cohen, Pontani Lieberman & Pavane

(57) ABSTRACT

Filling valve for a gas bag installed in a space bounded by rigid walls, where the forces of a liquid medium, which is under pressure and which flows into and out of this space, act on this space. The gas bag serves as a compensation space, is filled with gas, and can be filled through a filling valve, which has an access channel aligned with an opening in the rigid wall. The access channel is located in a connector part connected to the gas bag, the connector part also being connected to a guide part resting against the inside surface of the rigid wall, the access channel being in effective connection with the opening in the rigid wall via this guide part.

13 Claims, 4 Drawing Sheets

FILLING VALVE FOR A GAS BAG

BACKGROUND OF THE INVENTION

1. Field of the Invention

The invention pertains to a filling valve for a gas bag installed in a space bounded by a rigid wall and acted on by forces of a liquid flowing into and out of the space under pressure. The gas bag serves as a compensation space and is filled with gas through an access channel aligned with an opening in the rigid wall.

2. Description of the Related Art

U.S. Pat. No. 6,116,585 discloses a gas bag made out of plastic-coated metal foil. A gas bag of this type can be used anywhere that gas-filled compensation elements can be installed in spaces bounded by rigid walls, where there is no pressure difference between any of the interior spaces of the compensation element and the exterior pressure space and thus where the wall of the compensation element must merely be flexible and is not called upon to move elastically. These conditions for compensation elements are present in hydropneumatic assemblies such as in the compensation space of a shock absorber or in the spring space of a hydropneumatic spring. Therefore, gas bags of the type disclosed in the patent can be used here. The essential point, is that during the installation and filling of this gas bag, no forces which could tear the thin wall of the gas bag may act or be exerted on the wall. In the case of shock absorbers, the gas bag is preferably filled only after the vibration-damping fluid has been introduced. For this purpose, this known design provides a filling connector, installed in the thin wall of the gas bag; during the installation, this connector is snapped into an opening in the rigid wall, i.e., in the external tube of the shock absorber. Because the gas bag is surrounded by vibration-damping fluid during operation, a lifting force acts on it, which must be at least partially absorbed by the filling connector.

SUMMARY OF THE INVENTION

The object of the present invention is to create a gas bag which, after installation in the compensation space, can be filled from the outside through a filling valve in such a way that, during filling and during operation, no forces are exerted on the gas bag wall, and the gas bag together with the filling valve can be produced, installed, and filled at low cost.

The gas bag provided with the filling valve can be easily designed in such a way that it is almost completely free of forces acting on it from the outside by locating the access channel in a connector part connected to the gas bag and by connecting this connector part to a guide part resting on the inside surface of the rigid wall, where the access channel of the filling valve is effectively connected to the opening in the rigid wall by this guide part. Thus, the lifting forces exerted on the gas bag by the vibration- damping fluid are absorbed by the guide part, and the connector part remains free of the action of any forces.

The connector part and the gas bag can be connected in an especially low- cost manner by integrating the connector part into a connecting seam located at one of the axial ends of the bag during the process of bag production. It is advantageous for this connecting seam to be made as a welded seam, although other methods of creating the connection are also conceivable. The connector part is provided with a relatively large dimension extending in the direction of the welded seam, and it is also provided with surfaces which ensure a gentle transition during the welding-in process, so that a very good, gas- tight connection is obtained. At the same time, the welded seam serves as a connection to the guide part. For this purpose, the guide part is provided with an opening which conforms exactly to the shape of the connector part and the welded seam. The connector part has a seal surrounding the access channel, this seal being pressed against the inside surface of the rigid wall.

It is advantageous for the gas bag to have attachment holes near the welded seam, which can be snapped onto corresponding retainers on the guide part. Thus the gas bag, which is produced as a flat component, assumes its approximately tubular shape as soon as it is assembled with the guide part and is held in the proper axial position by the guide part extending around the circumference, which simultaneously facilitates the installation of the gas bag in the properly oriented position in the compensation space of the shock absorber by the use of an installing device.

The gas bag can also be easily connected tightly to the guide part, at least in the axial direction, in the area of the connector part by means of a projection extending inward in the radial direction, which can be snapped into a corresponding hole in the guide part. This inward-pointing projection is advantageously provided on the connector part and can work together with a corresponding hole in the bottom sheet to ensure the exact positioning of the connector part during the production of the welded seam.

In one embodiment, the access channel in the connector part has an opening, extending radially with respect to the gas bag. This opening is located so that it can cooperate with another opening located in a cylindrical wall. A seal provided in the area of the opening is thus pressed by the guide part against the cylindrical wall, so that the opening in the cylindrical wall is connected only to the access channel during the filling process. The valve for the gas bag must prevent the gas which fills the bag from escaping through the access channel. To accomplish this, after the filling process has been completed, the guide part is pushed along the inside surface of the space until the opening present in the rigid wall is no longer in effective connection with the access channel. To ensure that the shock absorber is sealed off effectively after the guide part has been shifted, the opening should either end up between two sealing rings, which are located in grooves in the guide part, or be closed by a sealing ring.

In a highly advantageous embodiment, which makes possible a simpler overall design and also allows for trouble-free assembly, the connector part is provided with an access channel proceeding exclusively in the axial direction, this channel being located so that it can cooperate with an opening in the rigid wall proceeding in the axial direction. It is also possible without any extra effort to provide the access channel with an axially oriented connecting line, which engages in the opening or passes through the opening. A connecting line of this type can, for example, be connected to a pressure sensor and thus be used to control a device of some type as a function of the pressure. In a further simplification of the filling valve, the connector part is designed as an integral part of the guide part. A low-cost design is also obtained when the connector part is formed by the piston rod guide, in which case the piston rod guide can be preassembled with the gas bag and the filling valve to form a unit. In general, the connector part can include a valve device as an integral part. This valve device can take the form of a generally known valve, such as a mechanically opening valve or a valve consisting of elastomeric material, where the elastomer must be impermeable to the diffusion of oil and gas, and where the filling process is accomplished by means of a hollow needle, which is used to puncture the elastomer. For protection against any damage to the filling valve, the opening can be sealed by measures conventional in machine-building such as by the pressing-in of a ball.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
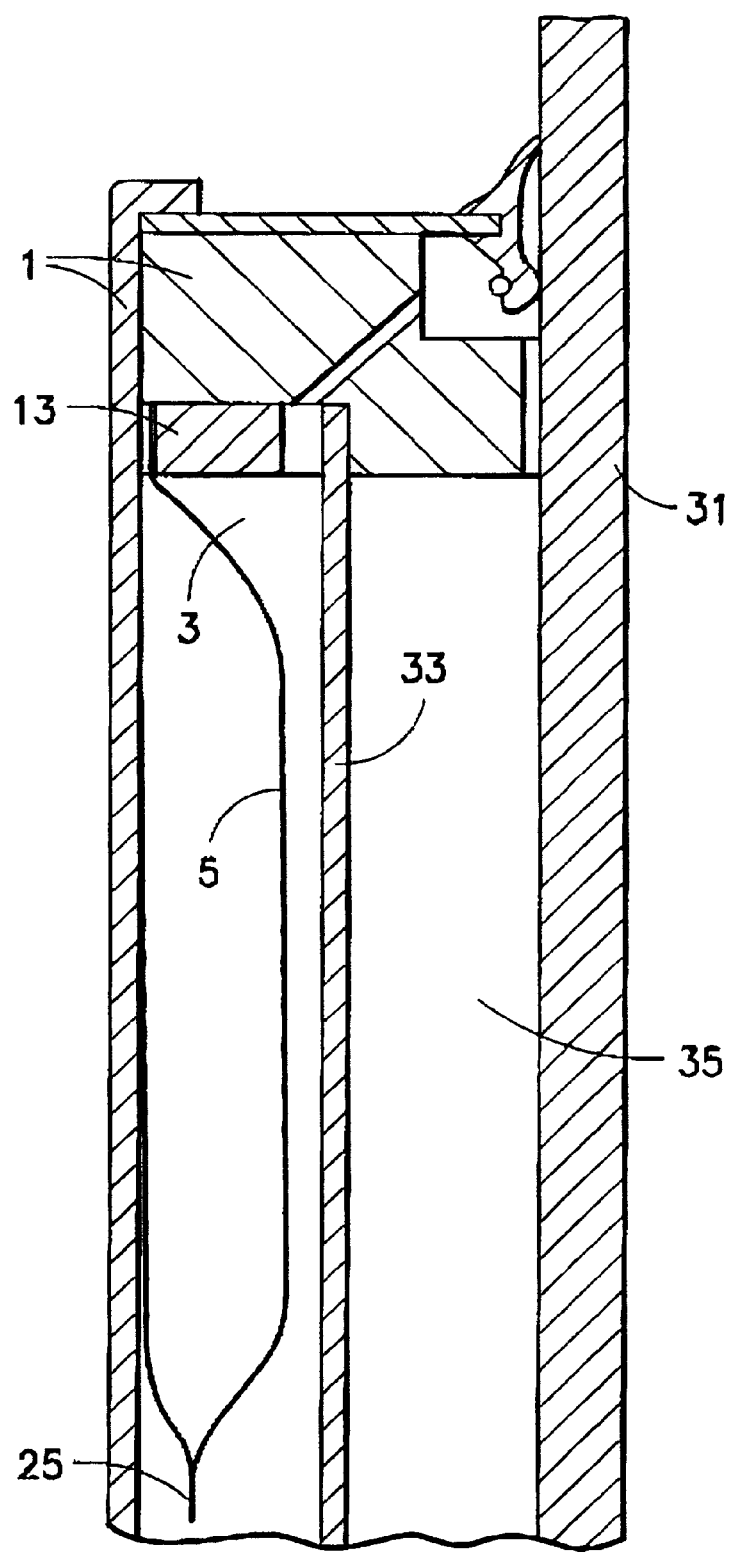
FIG. 1 shows part of a longitudinal cross section through a dual-tube shock absorber.

In the embodiment shown in FIG. 1, a gas bag 5 is located in a space 3, which is filled with liquid. As an example of the use of a gas bag 5 of this type, a dual-tube shock absorber has been selected. The design and function of these devices are sufficiently well known in themselves and therefore do not need to be described in detail here. The space 3 forms the compensation space for the damping fluid displaced by the piston rod 31 during its inward and outward movement; the upper working space 35, which is completely filled with the damping fluid, is in fluid-conducting connection with the space 3 by way of damping valves. The space 3 is bounded by the rigid walls 1 and by the wall of the cylinder 33, which is also rigid. The gas bag 5 consists of a diffusion-proof wall, which is made out of metal foil provided with a backing layer. The bag can be produced, for example, by welding or bonding two separate sheets of this foil material together, where one is lying on top of the other. In this way, an initially flat gas bag 5 is created with a welded seam 25 extending around the periphery, the bag being connected at one end in the area of the seam to a guide part 13. In the example shown, this guide part 13 is designed as a ring, with the result that the gas bag 5 assumes its installation position as soon as it is connected to the guide part.

Figure 2:
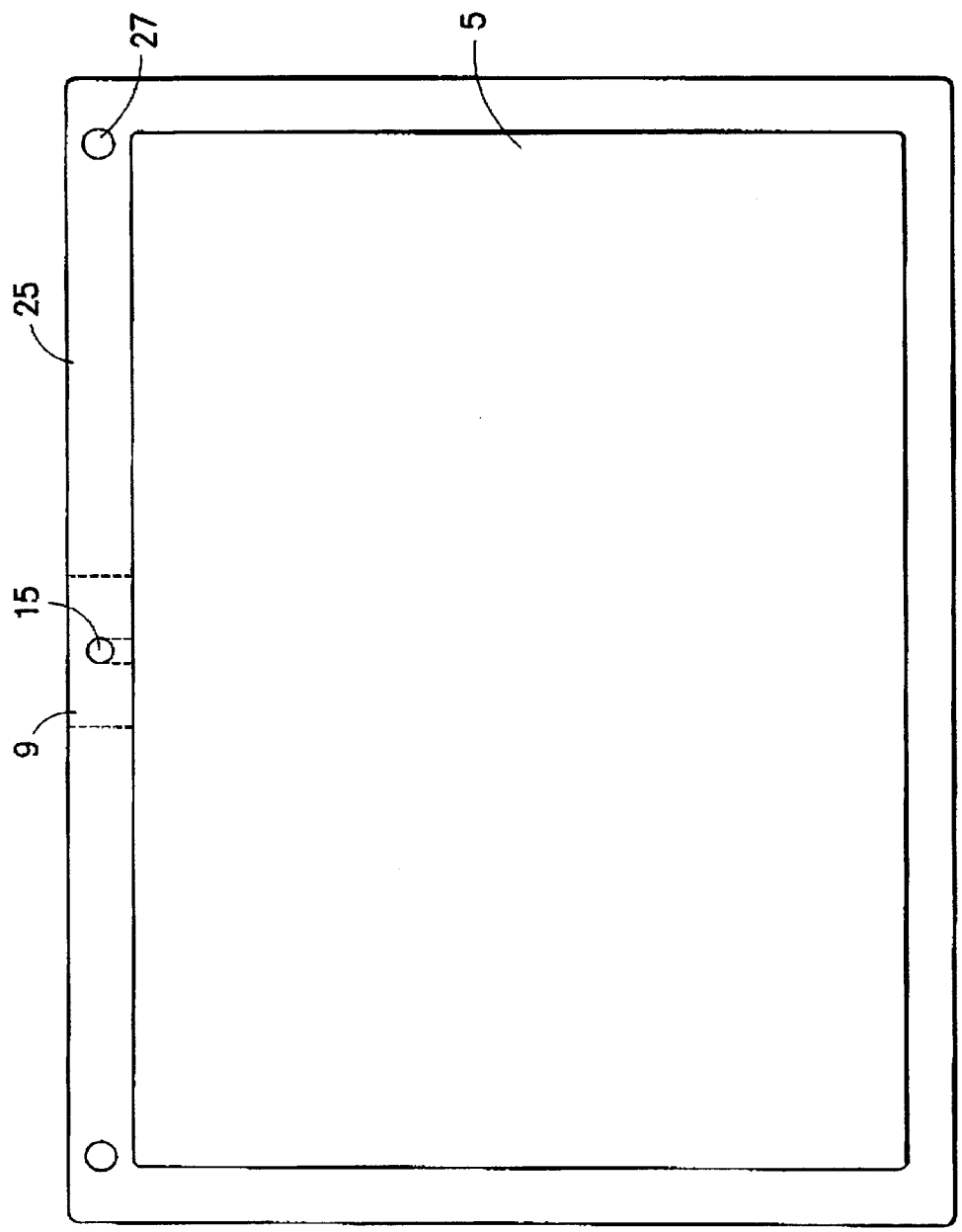
FIG. 2 shows a gas bag in plan.

FIG. 2 shows a plan view of a gas bag 5 after it has been produced. While the gas bag 5, consisting of two layers of foil, is being assembled, a connector part 9, which has an access channel 15, is connected simultaneously to the gas bag at one end. The joining of the foils and the simultaneous connection of the bag to the connector part 9 can be accomplished by methods known in themselves for such joinings, e.g., by welding, adhesive bonding, heat-sealing, or similar types of connecting methods. In the present exemplary embodiment, the foils and the connector part 9 are advantageously welded to each other, as a result of which a peripheral welded seam 25 is formed, and the gas bag 5 forms an inseparable structural unit together with the connector part 9. After the gas bag 5 has been installed in the space of variable volume connects the interior space of the gas bag to an opening in a rigid wall and thus makes it possible for the gas bag to be filled. In addition, attachment holes 27 are also provided, which are also used to connect the bag to the guide part.

Figure 3:
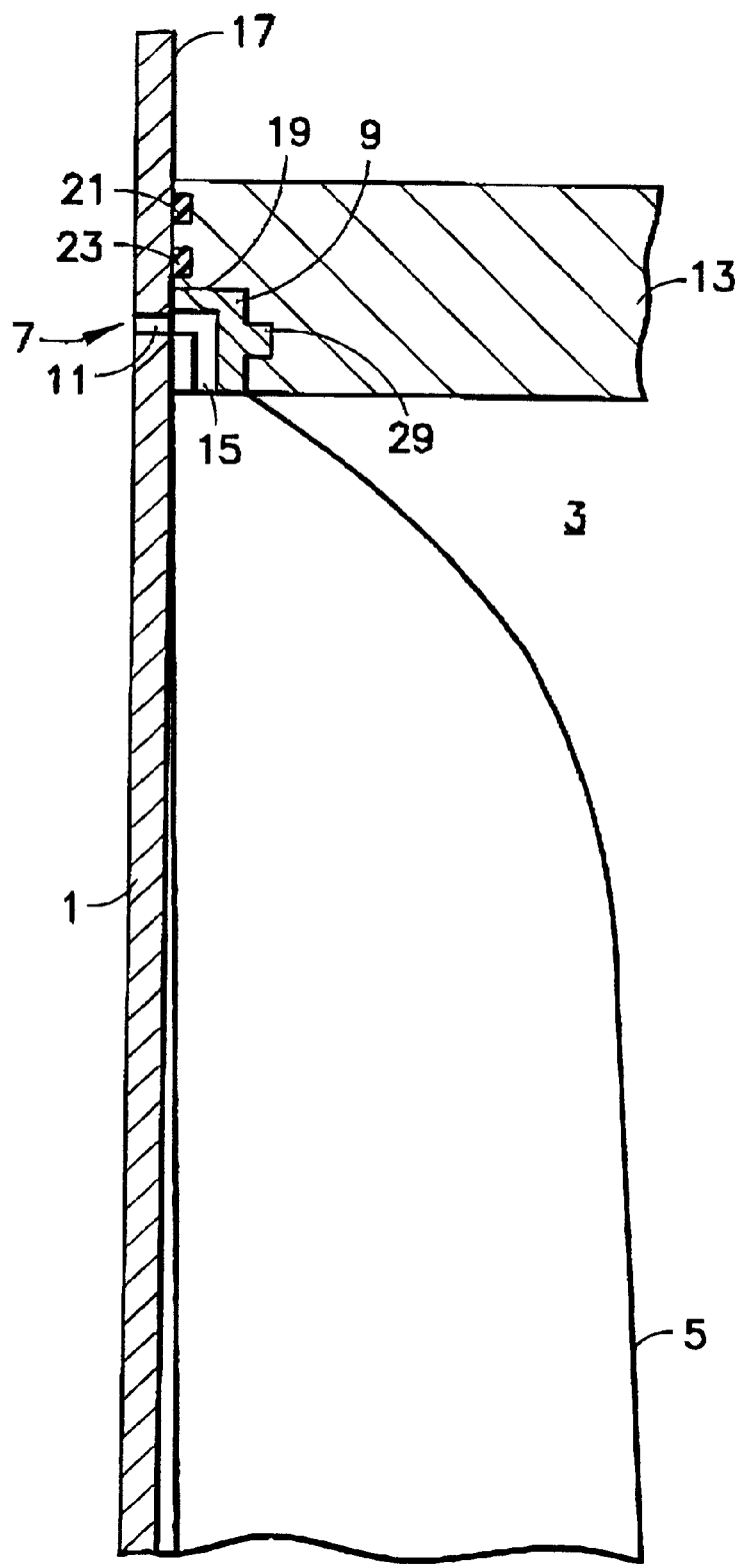
FIG. 3 shows a design of the filling valve, where the rigid wall is formed by the outer tube.

FIG. 3 shows the arrangement of the gas bag 5 according to FIG. 2 in the fluid-filled space 3. Before the gas bag 5 is introduced into the space 3, which forms, for example, the compensation space of a shock absorber, the bag is first connected to a guide part 13. For this purpose, the guide part is provided with corresponding holes and projections, with which a projection 29 on the connector part 9 and the attachment holes 27 shown in FIG. 2 engage. The holes 27 and projections 29 of the guide part 13 are designed in such a way that, after the gas bag 5 has been placed in position, the external contour of the assembly unit thus formed conforms exactly to the inside surface 17 of the rigid wall 1. With the help of an installing device, the preassembled unit consisting of the gas bag 5 and the guide part 13 is brought into the position shown in the figure, so that an opening 11 in the rigid wall 1 belonging to the filling valve 7 leads to the access channel 15, and thus a connection to the interior space of the gas bag 5 is established. To seal off the interior space 3 against the opening 11 and the access channel 15, the connector part 9 carries a seal 19. After the gas bag 5 has been filled and the pressure inside it is thus equal to the pressure in the fluid in space 3, which means that the walls of the gas bag are not being stretched in any way, the filling valve 7 is closed by the axial displacement of the guide part 13. Thus, either the seal 21 or the seal 23 blocks off the opening 11, or the opening 11 ends up between the two seals 21, 23. For protection against the loss of gas, the opening 11 can also be closed by a method such as welding, soldering, or the pressing-in of a ball.

Figure 4:
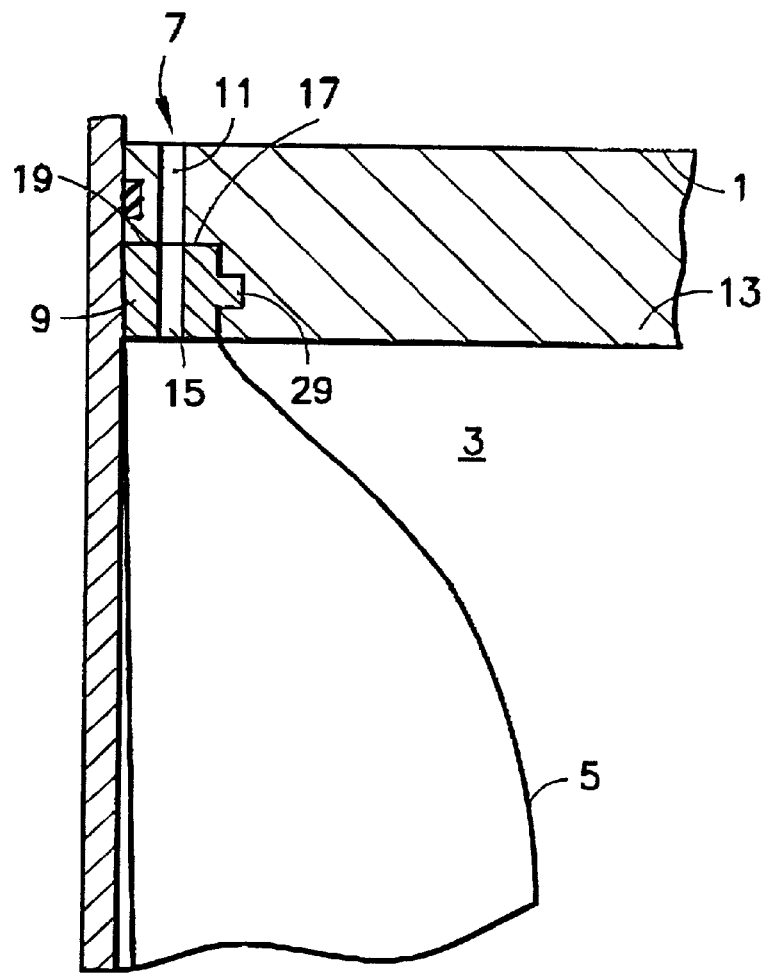
FIG. 4 shows a design of the filling valve to be filled through a cover plate.

FIG. 4 shows another advantageous embodiment. The rigid wall 1 is formed by a cover disk at one end, which has both the bore 11 associated with the filling valve 7 and the inside wall surface 17, which serves as a contact surface for the connector part 9 and the seal 19. The rigid wall 1 is designed as an integral part of the guide part 13 and has a shape which conforms to that of the connector part 9 and the corresponding welded seam of the gas bag 5. A hole in the guide part 13 associated with the projection 29 on the connector part 9 ensures that the access channel 15, which is straight, corresponds exactly with the opening 11, which means that there is no need for an installing tool to make the access channel 15 line up exactly with the opening 11. When the preassembled unit consisting of the gas bag 5 and the guide part 13 is introduced into the space 3, the outer layer of the connector part 9, formed by the welded seam, is supported against the inside surface of the cylindrical outside tube, so that the seal 19 of the connector part 9 is pressed against the inside surface 17 of the rigid wall 1; and a good seal is guaranteed. After the gas bag 5 has been filled, the opening 11 can be closed by caulking, welding, soldering, or by pressing in an object.

Figure 5:
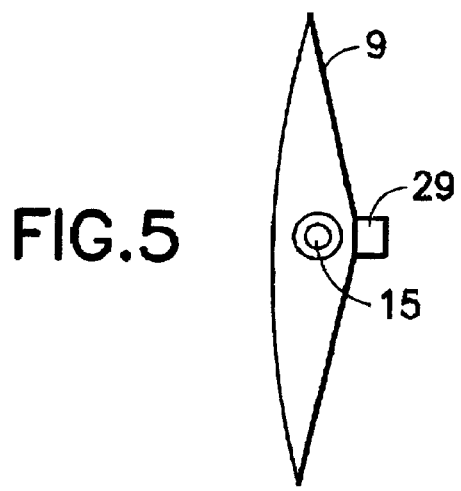
FIG. 5 shows a top view of the connector part corresponding to the design of FIG. 4.

The top view of the connector part 9 shown in FIG. 5, as installed in the design according to FIG. 4, shows clearly how its shape conforms to the inside contour of the outer tube. It also shows the relatively large dimension in the circumferential direction, the ends of which taper to a point to provide a gentle transition, as a result of which a good and gas-tight connection to the foil of the gas bag is created. The association of the projection 29 with the access channel 15 can also be seen, as a result of which the precise installation position with respect to the opening in the rigid wall is achieved.

Common to all the embodiments shown is that the lifting force acting on the gas bag 5 is absorbed essentially by the guide part 13, and thus the thin foil wall of the gas bag is free of these forces. The shape of the connector part 9 is not limited to the designs shown. It is therefore also possible, for example, to integrate a valve device, namely, a valve consisting either of a gas- and fluid-tight elastomer or of a mechanical valve, into this connector part. The elastomer can itself form the connector part, or it can be installed in the access channel, so that it can be punctured by a hollow needle as part of the filling process. After the needle is removed, the elastomer seals off the gas bag again. A suitable mechanical valve consists, for example, of a sealing element molded onto the connector part, actuated by a pin during the filling process.

The way in which the connector part is connected to the gas bag is not limited to the embodiments described above either. Thus, to facilitate production, the foil and/or the connector part can be provided with a layer of adhesive or sealant before the structural unit consisting of the gas bag and the connector part is assembled. In the case of hydropneumatic units which have several compensation and/or spring spaces, furthermore, a gas bag can be installed in each one of these spaces.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A hydropneumatic assembly comprising
    a rigid wall having an inside surface bounding a space, said rigid wall having an opening,
    a liquid under pressure which flows into and out of said space, said liquid exerting forces in the space,
    a gas bag installed in said space, said gas bag being filled with gas and acted on by forces exerted by said liquid,
    a guide part fitted against the inside surface of the rigid wall, and
    a connector part fitted in said guide part, said connector part being connected to said gas bag and having an access channel which can be aligned with said opening in said rigid wall via said guide part.

2. A hydropneumatic assembly as in claim 1 wherein said gas bag comprises an axial end with a welded seam, said connector being welded into said axial end.

3. A hydropneumatic assembly as in claim 1 wherein said guide part comprises a recess profiled to closely receive said connector, said connector comprising a seal surrounding said access channel where it aligns with said opening in said rigid wall.

4. A hydropneumatic assembly as in claim 2 wherein said gas bag comprises attachment holes in said welded seam, said guide part having retainers which cooperate with respective said attachment holes to retain said gas bag.

5. A hydropneumatic assembly as in claim 1 wherein said guide part has a recess and said connector has a projection which snaps into said recess to establish a permanent connection.

6. A hydropneumatic assembly as in claim 1 said rigid wall is a cylindrical wall, said access channel having a portion which extends radially with respect to said opening in said cylindrical wall.

7. A hydropneumatic assembly as in claim 6 wherein said guide part has at least one groove which positions a seal against said circumferential wall, said guide part being movable after said gas bag is filled so that said opening is isolated from said access channel by said at least one seal.

8. A hydropneumatic assembly as in claim 1 wherein said rigid wall is an axial wall of a cylinder, said access channel extending axially with respect to said opening in said axial wall.

9. A hydropneumatic assembly as in claim 1 wherein said connector further comprises a connecting line extending axially from said access channel and into said opening.

10. A hydropneumatic assembly as in claim 1 wherein said connector part is formed integrally with said guide part.

11. A hydropneumatic assembly as in claim 1 further comprising a valve installed in said access channel.

12. A hydropneumatic assembly as in claim 11 wherein said valve comprises an elastomer which is impermeable to oil and gas, said gas bag being fillable by a hollow needle received through said elastomer.

13. A hydropneumatic element as in claim 11 wherein said valve is a mechanical valve.

* * * * *